Jan. 22, 1963  R. G. DUTHIE  3,074,786
FLUID MIXER WITH ROTATING BAFFLES AND METHOD OF OPERATING SAME
Filed Dec. 17, 1959

INVENTOR:
ROBERT G. DUTHIE
BY: Oswald H. Milmore
HIS ATTORNEY

United States Patent Office 3,074,786
Patented Jan. 22, 1963

3,074,786
FLUID MIXER WITH ROTATING BAFFLES AND METHOD OF OPERATING SAME
Robert G. Duthie, Orinda, Calif., assignor to Shell Oil Company, a corporation of Delaware
Filed Dec. 17, 1959, Ser. No. 860,151
11 Claims. (Cl. 23—310)

The invention relates to internally baffled, multi-stage mixing apparatus suitable, for example, as solvent extraction, adsorption or contacting apparatus or as chemical reactors, for effecting intimate contact between at least partially immiscible phases. The invention finds especial utility for contacting two phases countercurrently when one contains solid particles, e.g., consists of small particles or is a slurry of such particles in a liquid, and the other phase is a liquid or a gas ("gas" being used herein to include vapor); it is, however, also applicable to contacting two liquid phases or a liquid and a gaseous phase.

Such fluid mixers include an elongated, usually vertical vessel which contains two series of axially spaced baffles mounted for relative rotation, the baffles of one series being annular and usually stationary and subdividing the vessel into a series of compartments or stages which are in consecutive intercommunication through the central openings in the annular baffles, and those of the other series, herein called inner baffles, being fast on a shaft and disposed so that there is at least one inner baffle within each or most of said compartments, the said shaft and innuer baffles being usually rotatable. Relative rotation imposes shear on fluent phases within the compartments, which disperses one phase in the other and sets up toroidal vortex flow patterns from which parts of the phases settle by gravity in opposite directions in accordance witht heir relative densities. Either the phase of relatively greater density or that of relatively lesser density may be dispersed. Such devices are hereinafter for brevity called "mixers of the character described."

One type of such mixers is known as the rotating disc contactor; it and the general principles of operation and the vortex patterns created are disclosed in various forms in U. S. Patents Nos. 2,601,674, 2,729,544, 2,729,545, 2,893,846 and 2,912310.

As is set forth in the cited patents, a part of each phase in the dispersion is recirculated within each compartment and only a fraction of each phase gravitates into the adjacent higher or lower compartment through the openings in the annular baffles. When the fractional part of a given phase which gravitates is reduced by any cause, the inventory of that phase within the compartment increases at the expense of the other. This inventory is known in the art as "hold-up" and will be herein so called.

For example, gravitation of the dispersed phase can be retarded by an increase in the mixing intensity by using higher rotor speeds, which leads to finer dispersed drops which settle less readily, or by employing smaller openings between compartments, or by variations in the properties of the other phase a fluid which results in a higher viscosity or a density which is closer to that of the dispersed phase, or by analogous changes in the properties of the dispersed phase. Such changes have a lesser influence in reducing the rate of gravitational settling of the continuous phase. Although the total or gross throughput through the vessel can be controlled externally by regulating the feed and discharge rates to and from the mixer, this does not influence the relation between the rates at which the two phases gravitate in opposed directions. Hence such changes tend to increase the hold-up of the dispersed phase. Conversely, making such changes in the opposite sense increases the settling rate of the dispersed phase in relation to that of the continuous phase and reduces the hold-up thereof.

It is evident that such an increase in the inventory of one of the phases does not necessarily continue until flooding is reached, because the increased inventory itself causes increased settling. However, when equilibrium between influx and exit of the given phase is established, the compartment will continue to operate with a greater inventory of that phase.

In mixers of the character described, it is often important to control the hold-up during operation of the mixer independently of the above-mentioned variables, i.e., independently of the properties of the phases (which may vary at random or be invariable and, for either reason, be beyond control) and of the physical dimensions or rotor speed of the mixer. In the case of liquid phases this control can, indeed, usually be effected by a change in the rotor speed (alone or together with external control of the feed and discharge rates) be-effected by a change in the rotor speed (alone or together with external control of the feed and discharge rates) because it influences the fineness of the dispersed droplets and, hence, their settling rate. In fact, by using a sufficiently high rotor speed, settling can be reduced to the extent that flooding occurs. However, when solids are present and are contacted with a liquid or a gas, the particle size is not usually influenced by the rotor speed (save insofar as there may be attrition or disruption of conglomerates of particles by shear) and changes in rotor speed have little or no influence on the settling rate. For this reason optimum contacting cannot be achieved under varying loads or particle-size distribution unless the solid-phase hold-up can be controlled by other means. Control of settling rates by rotor-speed control is, further, often not feasible when a gas is contacted with a liquid. Also, in the case of liquid-liquid dispersions, it is sometimes undesirable to vary the rotor speed sufficiently to achieve the desired control.

It is the object of this invention to provide an improved mixer of the character described wherein the settling rate, and thereby the hold-up, can be controlled during operation independently of the rotor speed, and to provide an improved method of contacting fluent materials wherein control of hold-up is achieved independently of the rotor speed.

Additional and specific objects will become apparent from the following description.

In accordance with the invention the fluent material to be mixed is passed through a mixer of the character described and the flow of the material through one or more annular baffles is controlled by throttling the openings therein. The method can be practiced in a variety of specific mixers providing such throttling means. According to a preferred embodiment one series of baffles is made axially adjustable with respect to the other in a manner to vary the extent to which the inner baffles obstruct or restrict the openings in the annular baffles, and at least one series of baffles is constructed to permit such adjustment to be effected during operation of the mixer. Preferably, the hold-up is measured continuously or intermittently during operation and an appropriate corrective adjustment is made to bring the hold-up to a desired standard value.

In a specific aspect, the invention includes, in combination with the vessel and the two series of relatively rotating baffles and adjustment means, a device for measuring the hold-up which may have an indicator to permit the adjustment to be made in accordance with the observed indication, or which is connected through an operator or servo-mechanism to make the necessary corrective adjustments automatically.

Although one inner baffle is usually provided within each compartment defined by the annular baffles, and the inner baffles are preferably rotor discs or cones having outer diameters small enough to pass through the central openings in the annular baffles, the invention is applicable also to mixers wherein one or more of these conditions is/are not satisfied.

The invention will be described more particularly by reference to the accompanying drawings forming a part of this specification and showing a preferred embodiment, wherein.

Figures 1, 2, 3, 4:
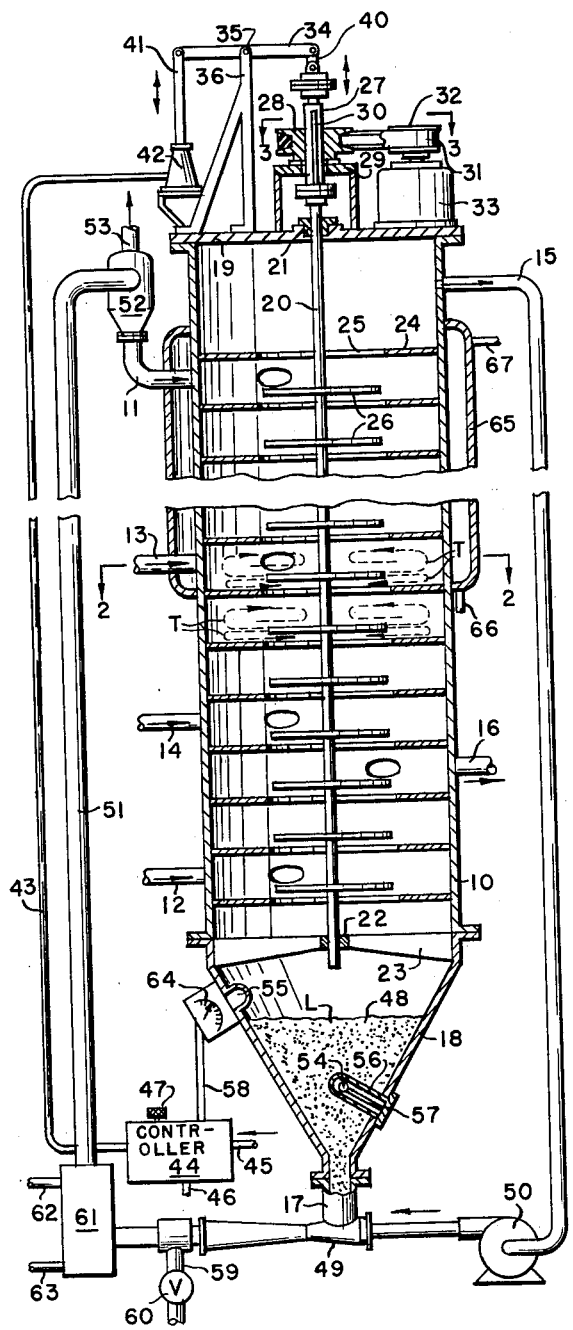
FIGURE 1 is a vertical sectional view of the mixer according to the invention.
FIGURE 2 is a transverse sectional view of the mixer, taken on the line 2—2 of FIGURE 1.
FIGURE 3 is a fragmentary transverse sectional view, taken on the line 3—3 of FIGURE 1.
FIGURE 4 is an enlarged view of the support bearing, parts being shown in section.

Referring to FIGURES 1–3, the fluid mixer is shown in a form suitable for bringing a solid material into contact with liquids. The mixer comprises a vertical vessel 10, circular in cross section, having upper and lower inlet pipes 11 and 12 and additional inlet pipes 13 and 14 at intermediate levels, all of which may optionally be tangential to the vessel in a common direction as shown. An upper discharge pipe 15 and an intermediate-level discharge pipe 16 communicate with the vessel, and a bottom outlet is provided by a pipe 17 connected to the bottom of a frusto-conical receiver 18 which is attached to the bottom of the vessel. The vessel is closed at the top by a closure plate 19 through which extends an axial rotor shaft 20, which is rotatable and vertically slidable in a sealed bearing 21. The bottom of the shaft is journalled in a radial bearing 22 supported at the axis by a spider 23. A series of horizontal annular stator baffles 24, e.g., flat plates which are imperforate save for central openings 25, is mounted immovably within the vessel at suitable intervals by suitable means, e.g., by welding. These openings are large in relation to the shaft, so that the compartments defined by these transverse baffles are in consecutive intercommunication. The shaft carries fixed thereto a series of inner, rotor baffles 26. In the embodiment shown these baffles are circular in shape and of size to just pass through the openings 25; further, both the stator and rotor baffles are thin flat plates and are spaced at equal intervals; these features are not, however, restrictive of the invention. The rotor baffles are positioned below the mid-heights of their respective compartments, near to their respectively adjacent lower stator baffles, so that they restrict the passages through the openings.

The top of the rotor shaft 20 is coupled to a spline shaft 27, by which the rotor shaft is supported and driven. The spline shaft is vertically slidable within a pulley 28 which is rotationally supported on a bearing support 29 carried by the plate 19 and which drives the shaft by a pair of splines 30. The pulley is driven by a belt 31 from the drive pulley 32 of a suitable variable-speed drive, such as a variable-speed electric motor 33. The spline shaft is supported from one end of a lever 34 which is pivoted at pin 35 held in a standard 36 which is mounted on the plate 19. As is shown in FIGURES 1 and 4 the connection between the lever and spline shaft includes a bearing 37, the inner axle 38 of which is fixed to the top of the spline shaft and the housing 39 of which is pivotally connected to the bottom of a link 40 which is pivoted to the lever 34. The other end of the lever is pivotally connected to a link 41 which is further connected to the driven element of a positioner 42 of any suitable type, herein diagrammatically represented by a pneumatic device of the type used to position valves in accordance with the air pressure in a control duct 43, the said pressure being controlled in a control unit 44 to which air under pressure is supplied by a duct 45. The lever 34 is properly counterbalanced in accordance with the weight of the rotor shaft and its baffles. Controllers and positioners of various types, also known as servo-motors, are well known and a detailed description thereof is, therefore, unnecessary herein. In brief, the controller contains means for venting a part of the air from the duct 45 through a vent 46 and for either admitting air into the duct 43 or venting air therefrom into the vent 46 so as to maintain a desired pressure in the duct 43 in accordance with an input signal, as described hereinafter, and a set point determined by the position of an adjustable knob 47.

The specific embodiment of the mixer described is designed for effecting contact between liquids and a subdivided solid material, which enters the upper part of the vessel through the inlet pipe 11 and is collected within the receiver 18 as shown at 48. This material is discharged through the pipe 17 and enters a jet eductor 49 in which it is entrained by a stream of liquid supplied by a pump 50. This liquid may, for example, be liquid discharged from the top of the vessel via the pipe 15. The resultant mixture flows through a riser pipe 51 into a separating device, such as a hydrocyclone 52, wherein the solid material is separated from the liquid and from which said material enters the inlet pipe 11. The liquid, freed from the solids, is discharged through a pipe 53.

The level L to which the solid material accumulates within the receiver is measured by any suitable level-indicator. A specific and exemplary indicator comprises a radio-active source 54 and a radiation detector or counter 55. The former is situated centrally within the lower part of the receiver within a well 56 and may, for example, consist essentially of cobalt-60 within a capsule at the end of a support rod 57. The amount or intensity of radiation which reaches the detector 55 is determined by the height of the level L, and the output from the detector 55 is transmitted to the controller 44 via an electrical circuit 58.

The pipe 51 may be provided with a branch pipe 59 which is normally closed by a valve 60 to permit the contents of the vessel to be drained and to permit the solid material to be introduced, e.g., as a liquid slurry. It may further be provided with a heat exchanger 61 through which a thermal fluid, e.g., cooling water, can be flowed via inlet and outlet pipes 62 and 63, respectively, in indirect heat exchange with the stream in the pipe 51.

The level indicator may have a scale and pointer 64 to indicate the level L.

In certain applications it is desirable to control the temperature within the mixer and to this end a jacket 65 may surround part or all of the vessel. The jacket defines an annular space through which a thermal fluid can be circulated via pipes 66 and 67.

It is evident that when a fixed quantity of such solids is charged into the mixer, e.g., via the inlet pipe 59, the level L to which the solids accumulate rises as the hold-up becomes smaller, and falls as the hold-up increases. Hence the level-detector constitutes a means for measuring the hold-up of the solids within the vessel.

Operation of the mixer is as follows: Liquid is admitted continuously through one or more of the inlet pipes 12, 13 and 14 and discharged via pipe 15, pump 50, pipe 51, hydrocyclone 52 and pipe 53; liquid may be further discharged via pipe 16. As will become evident from the example to follow, a gas may be admitted through one or more of these inlets. When the vessel is filled with liquid and the rotor shaft 20 is rotating at a speed determined by the motor 33, preferably in the same tangential direction as the tangential inlet direction of the inlet pipes 11–14, a predetermined quantity of solid particles is admitted via the valve 60 and pipe 59 in the form of a slurry and is admitted to the vessel through the pipe 11 after most of the entraining liquid is separated therefrom in the hydrocyclone 52. Toroidal vortices T are thereby set up within each compartment, as described in the cited patents, resulting in the dispersion of the solid particles in the liquid. The greater part of the resulting dispersion is recirculated within the vortices, in which the dispersion moves outward toward the vessel wall at the level of the rotating baffles 26 and moves inward toward the central axis adjacently to the stator baffles 24, while additionally moving circumferentially about the axis. A part of the dispersed solids settles by gravity from the vortices through the openings 25 into the respectively lower compartments, where they are picked up by the liquid and redispersed. Similarly, a part of the liquid settles upwards from the vortex in each compartment. Occasionally minor amounts of liquid flow downwards with the solids. No rotor baffles are provided above the uppermost and below the lowermost stator baffle, so that settling is facilitated in the top and bottom end zones.

As was previously explained, the rotor speed influences the intensity of mixing but does not significantly influence the sizes of the solid particles. Hence it has an insufficient influence on the rate at which these particles settled through the openings 25 to permit the hold-up to be controlled. In accordance with the invention this hold-up is controlled by adjusting the vertical position of the rotor shaft 20, whereby the rotor baffles 26 can be moved nearer or farther away from their respectively adjacent stator baffles. In one extreme the stator baffles can be positioned within the openings 25 while at the other extreme they can be moved almost to the mid-heights of their compartments. The openings 25 are thereby throttled to varying degrees, thereby changing the tendencies of the solids particles to settle and effecting thereby a control of the hold-up.

The vertical adjustment of the rotor shaft is effected by the positioner 42, which moves the lever 34 and thereby raises or lowers the rotor shaft. This adjustment may be effected manually by an operator who observes the indication of the level L on the scale 64 and then sets the control knob 47 to adjust the pressure within the duct 43. However, this adjustment may be made automatically by the controller 44 in accordance with signals received via the circuit 58 from the detector 55, the knob 47 being used to determine a set point corresponding to a desired position of the level L. Thus, as the level L rises above the desired level, the pressure in duct 43 is altered to lower the shaft 20 and thereby increase the hold-up; conversely, a fall in the level L causes the shaft to be raised to decrease the hold-up.

*Example*

The mixer may, for example, be used as a reactor to effect separation of a mixture of hydrocarbons which have different degrees of unsaturation, such as a mixture of isoprene and amylene, using a cuprous halide, such as cuprous chloride to form solid adducts with the isoprene. In such an application the feed mixture, such as a stream consisting of 28% isoprene, 2% or less of piperylene, and 70% or more of amylenes, is introduced via the pipe 13. A stream made up of approximately 80% cuprous chloride and 20% sand, is entrained in a suitable liquid, e.g., the said feed liquid, and a predetermined amount thereof is charged into the system via the pipe 59. Thereafter the valve 60 is closed and further amounts of solid are admitted only as required to replenish losses. The solid material is brought to a temperature of about 0° F. in the heat exchanger 61 and enters the top of the vessel via the pipe 11. During operation they enter the vessel at a rate approximately equal or slightly greater, on a weight basis, than the feed. The feed mixture moves upwards to the outlet pipe 15 countercurrently to the solids, which are dispersed in the toroidal vortices within the compartments. The conjugated dienes (isoprene and piperylene) of this ascending feed enter into a solid complex with the descending cuprous chloride. The complexing reaction is exothermic and the heat of formation is dissipated to a coolant fluid which is circulated through the jacket 65 encompassing the complexing or absorption zone of the reactor between the inlets 11 and 13. The residual amylenes are discharged as a part of the raffinate through the pipe 15. The downwardly flowing solid complex of cuprous chloride with the conjugated dienes is kept fluent by means of the sand, which reduces the tendency of the complex to agglomerate. This sand may be composed of any abrasive material, such as Ottawa sand, silica, aluminum oxide (Carborundum), or silica carbide.

The complex descends below the level of the inlet 13 and it is therein stripped of amylenes which may be carried down with the solids by a rinse solvent admitted at the inlet 14. This may, for example, consist of $C_8$ saturated hydrocarbons (termed solvent) having a temperature between 0 and 80° F. Most of this rinse solvent ascends and carries the displaced liquid feed constituents into the raffinate; a minor part of the rinse solvent may be discharged through the outlet 16. In the lower part of the vessel the rinsed complex and sand encounter a hot solvent, admitted as a vapor at a temperature of approximately 300° F. through the pipe 12 for the purpose of dissociating the complex, thereby liberating the complexed conjugated dienes. The latter enter the hot solvent phase, formed by condensation of the vapor and this phase is, for the most part, discharged through the outlet 16. A part of this hot solvent may ascend to join the rinse solvent and be ultimately discharged with the raffinate; however this flow of the hot solvent is minimized by allowing a part of the rinse solvent to flow downwards from inlet 14. Any conjugated dienes carried therewith into the upper part of the vessel are again complexed and carried down. The flow of hot solvent upwards from the pipe 12 serves to displace the conjugated dienes from the cuprous chloride so that the solids discharged via the pipe 17 are essentially free from these dienes; this achieves maximum recovery of the conjugated dienes by preventing the recycle thereof with the solids to the top of the complexing section as described below.

The solid material is collected in the receiver 18, discharged via the pipe 17, entrained in the raffinate from the pipe 15 in the jet eductor 49, cooled to about 0° F. in the heat exchanger 61, and fed into the hydrocyclone 52. The raffinate is discharged from the latter via the pipe 53 and the solids are returned to the vessel via the pipe 11. The hold-up of solids within the vessel determines the height of the level L in the receiver, and this level is detected by the detector 55, acting in conjunction with the radio-active source 54. The controller 44 receives a signal indicative of the said level and controls the operation of the positioner 42 to raise or lower the rotor shaft 20, thereby controlling the hold-up as was previously described.

Control of the hold-up is important in the given example to cause the solids to pass through the contactor at the correct rate, sufficient to complex with all of the conjugated dienes. Although in most cases the solids are denser than the liquid, the invention is applicable also when the reverse is true and the solids settle upwards.

The mixer may be variously applied to such other purposes as metallurgical leaching of ores (which may involve chemical reactions of solids and liquids), washing of ice crystals in freeze-desalting of water, drying granulated solids (using gas as the fluid phase), and heterogeneous catalytic reactions, either solid-liquid or solid vapor, and fractional distillation, involving vapor-liquid contacting.

Although in most cases the solids are denser than the liquid, the invention is applicable also when the reverse is true and the solids settle upwards.

I claim as my invention:

1. In the method of contacting fluent materials of which one consists essentially of subdivided solids by flowing said materials through a fluid mixer which comprises a vessel containing a series of vertically spaced, annular baffles defining intercommunicating compartments and a series of inner baffles situated within said compartments, rotating one of said series of baffles with respect to the other and thereby creating toroidal vortices in said material forming a dispersion of one said material in the other within said compartments, and transferring said materials between adjacent compartments by gravitational flow through the central openings in said annular baffles, the improvement of controlling the hold-up within said vessel by throttling at least some of said central openings and thereby restricting the gravitation of said material through said openings, and adjusting the degree of said throttling during operation of the mixer to control the said holdup.

2. Method according to claim 1 wherein said openings are throttled by the said inner baffles and the degree of throttling is adjusted by altering distances from at least some of said inner baffles to the adjacent annular baffles, said inner and annular baffles being close enough to cause the former to obstruct partially the openings in the latter and restrict the flow of material therethrough.

3. Method according to claim 1 which includes additionally, measuring the hold-up of at least one of said materials in the mixer and adjusting the degree of throttling during operation of the mixer in accordance with the measured hold-up.

4. In the method of contacting subdivided solids with a fluid by flowing said solids and fluid countercurrently through a mixer which comprises an upright vessel containing a series of vertically spaced, annular stator baffles defining intercommunicating compartments and a series of inner, rotor baffles situated within said compartments, rotating said rotor baffles relatively to said stator baffles and thereby forming toroidal vortices of said fluid and dispersing said solid material in said fluid within said compartments, and transferring said solids and fluid between adjacent compartments by gravitational flow through the central openings in the annular baffles, the improvement of altering the vertical distances between said rotor and stator baffles during the operation of the mixer to adjust the degree to which the rotor baffles obstruct the openings in the stator baffles and thereby controlling the gravitation of said solid material through the said openings.

5. Method according to claim 4 which includes the steps of measuring the hold-up of said solids within the vessel and altering the said vertical distances in accordance with the measured hold-up.

6. Method according to claim 5 which includes the steps of accumulating the solid materials after discharge from the vessel within a receiver, recirculating solid materials from said receiver at a controlled rate to a part of the vessel displaced from the point of discharge in a direction opposite to the solids settling direction, the total amount of said solids in the vessel, receptacle and the recirculating means being held constant, and measuring the hold-up by measuring the level to which said solids are accumulated within said receptacle.

7. A fluid mixer which comprises: an axially elongated vessel one end of which is higher than the other; a series of transverse, axially spaced, annular baffles mounted within said vessel and defining a series of compartments which are in consecutive communication through central openings in said baffles; means for admitting a fluent material to the vessel at one end of the series of compartments and for discharging the material at the other end of the series; a series of inner baffles mounted in axially spaced relation on an axial shaft and situated within said compartments, at least one of said series of baffles being mounted for rotation, said baffles being constructed to cause toroidal vortices to be formed in said material within said compartments by relative rotation of said baffles; means for rotating one of series of baffles relatively to the other; throttling means for adjustably throttling the openings in at least some of said annular baffles to restrict the flow of said material therethrough, whereby the hold-up within the mixer can be controlled; means for measuring the hold-up of a fluent material in said vessel; and regulating means responsive to said measuring means for actuating said throttling means to maintain a predetermined hold-up.

8. In combination with the mixer according to claim 7, a receiver for collecting effluent from said series of compartments; and means for recirculating material from said receiver at a controlled rate to the other end of the series of compartments, the said measuring means comprising a level-detector for measuring the quantity of said material accumulated within the receiver.

9. A fluid mixer which comprises: an upright, elongated vessel; a series of transverse, axially spaced, annular stator baffles mounted within said vessel and defining a series of compartments which are in consecutive communication through central openings in said baffles; a rotor including an axial rotor shaft and a series of rotor baffles mounted for rotation, said rotor baffles being situated within said compartments so as to form toroidal vortices of fluent material within said compartments, at least some of said rotor baffles being displaced from the mid-heights of their compartments sufficiently near to adjacent stator baffles to restrict the central openings therein and said displaced rotor baffles and their respectively adjacent stator baffles being relatively adjustable vertically during rotation of said rotor to permit the degree of said restriction to be varied, means for rotating said rotor; and means for adjusting the vertical relation of said displaced rotor baffles and their respectively adjacent stator baffles and means for admitting and discharging fluent material to and from the vessel for countercurrent flow through said compartments.

10. A fluid mixer according to claim 12 wherein the said means for adjusting the vertical relation between said displaced rotor baffles and their respectively adjacent stator baffles includes a motor drive means connected to move one group of said relatively adjustable baffles.

11. A fluid mixer which comprises: an upright, elongated vessel; a series of transverse, axially spaced, annular stator baffles mounted within said vessel and defining a series of compartments which are in consecutive communication through central openings in said baffles; a rotor shaft extending through said openings and mounted for rotation and for axial motion; a plurality of rotor baffles fixed to said shaft for movement therewith, said rotor baffles being situated within said compartments so as to form toroidal vortices of fluent material within said compartments and at least some of the rotor baffles being displaced from the mid-heights of their compartments sufficiently near to adjacent stator baffles to restrict the central openings therein; means for rotating said rotor shaft; means for shifting said shaft axially to vary the degree of restriction of said openings; and means for admitting fluent materials to said vessel at spaced levels for countercurrently flow through said series of compartments and for discharging said materials from the vessel after countercurrent flow therethrough.

References Cited in the file of this patent

UNITED STATES PATENTS 2,391,110    Walker    Dec. 18, 1945
2,601,674    Reman    June 24, 1952